US008413855B2

(12) United States Patent
Ophardt et al.

(10) Patent No.: US 8,413,855 B2
(45) Date of Patent: Apr. 9, 2013

(54) PISTON WITH FRANGIBLE PISTON STOP

(75) Inventors: Heiner Ophardt, Vineland (CA); Andrew Jones, Smithville (CA); Zhenchun (Tony) Shi, Hamilton (CA)

(73) Assignee: Gotohti.com Inc., Beamsville, Ontario (CA)

( * ) Notice: Subject to any disclaimer, the term of this patent is extended or adjusted under 35 U.S.C. 154(b) by 318 days.

(21) Appl. No.: 12/926,538

(22) Filed: Nov. 24, 2010

(65) Prior Publication Data

US 2011/0132933 A1 Jun. 9, 2011

(30) Foreign Application Priority Data

Dec. 8, 2009 (CA) ...................................... 2687879

(51) Int. Cl.
*G01F 11/00* (2006.01)

(52) U.S. Cl. ............... 222/321.8; 222/181.3; 222/321.9; 222/321.1; 29/888.02

(58) Field of Classification Search ............. 222/153.06, 222/153.07, 153.09, 181.3, 321.1, 321.7–321.9, 222/541.1, 541.6, 541.9, 386, 180, 181.2, 222/181.1; 29/888.02
See application file for complete search history.

(56) References Cited

U.S. PATENT DOCUMENTS

| | | | | |
|---|---|---|---|---|
| 5,431,309 | A | 7/1995 | Ophardt | |
| 5,489,044 | A | 2/1996 | Ophardt | |
| 5,676,277 | A | 10/1997 | Ophardt | |
| 5,975,360 | A | 11/1999 | Ophardt | |
| 6,343,724 | B1 | 2/2002 | Ophardt et al. | |
| 6,409,050 | B1 * | 6/2002 | Ophardt et al. | 222/181.1 |
| 6,557,736 | B1 | 5/2003 | Ophardt | |
| 6,601,736 | B2 | 8/2003 | Ophardt | |
| 7,267,251 | B2 | 9/2007 | Ophardt | |
| 7,303,099 | B2 | 12/2007 | Ophardt | |
| RE40,319 | E * | 5/2008 | Ophardt et al. | 222/181.1 |
| 7,377,405 | B2 | 5/2008 | Ophardt | |
| 7,461,762 | B2 * | 12/2008 | Law et al. | 222/190 |
| 7,556,178 | B2 * | 7/2009 | Ophardt | 222/205 |
| 7,641,077 | B2 * | 1/2010 | Law et al. | 222/190 |
| 7,815,076 | B2 * | 10/2010 | Ophardt | 222/185.1 |
| 7,861,898 | B2 * | 1/2011 | Ophardt | 222/321.7 |
| 7,959,037 | B2 * | 6/2011 | Ophardt et al. | 222/321.9 |
| 8,157,134 | B2 * | 4/2012 | Ophardt et al. | 222/321.7 |
| 8,272,539 | B2 * | 9/2012 | Ophardt et al. | 222/181.1 |
| 8,313,008 | B2 * | 11/2012 | Ciavarella et al. | 222/135 |
| 2006/0261092 | A1 | 11/2006 | Ophardt et al. | |
| 2010/0140879 | A1 | 6/2010 | Ophardt et al. | |

* cited by examiner

*Primary Examiner* — Kevin P Shaver
*Assistant Examiner* — Donnell Long
(74) *Attorney, Agent, or Firm* — Thorpe North & Western LLP

(57) ABSTRACT

A piston pump assembly in which a piston-forming element to be received in a piston chamber of a piston chamber-forming member carries a removable stop flange member which may be secured to the piston chamber-forming member to provide a retention stop to prevent the piston-forming element from being removed from the piston chamber.

20 Claims, 13 Drawing Sheets

PISTON WITH FRANGIBLE PISTON STOP

SCOPE OF THE INVENTION

This invention relates to a piston pump, a method of manufacture of a piston pump, a method of assembly of a piston pump and a method of use of a piston pump assembly and, more particularly, to piston pumps with a stop member to prevent the removal of a piston from a piston chamber.

BACKGROUND OF THE INVENTION

Piston pumps are known in which a piston is reciprocally slidable within a piston chamber formed in a piston chamber-forming body so as to dispense flowable materials. In the context of dispensers for flowable material, notably hand soap dispensers, disposable plastic pumps are known which may be coupled to a reservoir containing fluid to be dispensed with the entirety of the reservoir and the plastic pump forming a cartridge that is replaceable and disposable after use. Plastic pumps of these type include those taught in the following U.S. patents to Ophardt: U.S. Pat. No. 5,975,360 issued Nov. 2, 1999; U.S. Pat. No. 6,601,736 issued Aug. 5, 2003; U.S. Pat. No. 7,267,251 issued Sep. 11, 2007; U.S. Pat. No. 7,303,099 issued Dec. 4, 2007 and U.S. Pat. No. 7,377,405 issued May 27, 2008, the disclosures of which are incorporated herein by reference. Piston pumps of the type disclosed in these patents are useful for engagement with and removal from fluid dispensers in a manner as disclosed in U.S. Pat. No. 5,431,309 to Ophardt issued Jul. 11, 1995 and for use in preparing a replaceable reservoir as in a manner disclosed in U.S. Pat. No. 5,489,044 to Ophardt issued Feb. 6, 1996, the disclosures of which are also incorporated herein by reference.

Replaceable fluid cartridges including a fluid filled reservoir with a piston assembly are known to be filled, shipped and stored filled with fluid and preferably with a separate, removable protective cap over the piston protecting the piston and the pump assembly. To use such a cartridge, the protective cap is removed and the reservoir and pump assembly are engaged with the dispenser with the dispenser typically supporting the reservoir and coupling the piston of the pump assembly with an actuator mechanism. Once the fluid in the reservoir has been exhausted, the cartridge comprising the reservoir and pump assembly is removed from the dispenser and replaced by another cartridge.

The present inventor has appreciated a number of disadvantages which arise with such prior art arrangements.

One disadvantage is that a user in attempting to ready a cartridge for use may remove not only the protective cap but also both the protective cap and the piston, with the removal of the piston rendering the pump inoperative. Another disadvantage is that a user may, after removing the cap, inadvertently withdraw the piston from the pump assembly as, for example, by incorrectly carrying the reservoir and its pump assembly merely by the piston. Another disadvantage is that when the piston may be removed from the pump assembly, removal of the piston out from the piston assembly can damage the piston or other components of the pump assembly and render the pump assembly inoperative or resulting in reinsertion of the piston into the piston pump which can cause damage preventing proper pump operation. Another disadvantage is that a user attempting to couple the cartridge to a dispenser may have the piston catch in an improper manner on the dispenser as on its activation mechanism such that the piston is damaged during installation or becomes engaged with the dispenser in a manner that prevents proper operation.

Another disadvantage is that during removal of the cartridge from the dispenser, a user may incorrectly remove the cartridge in a manner which damages the pump assembly as, for example, by leaving the entire piston or a portion of the piston in the dispenser damaging the dispenser or preventing proper function of the dispenser when the next cartridge is installed or attempted to be installed.

Previously known devices may provide a protective cap which encloses a discharge outlet portion of a piston pump and must be removed in order for use of the piston pump. The present inventor has appreciated the disadvantage that such protective caps provide an additional component which must be manufactured, assembled and discarded. Such protective caps also suffer the disadvantage that a user may be confused as to what must be removed and discarded with the disadvantage that sometimes not only the cap but also the piston itself is discarded rendering the pump inoperative.

The present inventor has appreciated the disadvantage that in the context of disposable pumps, each separate element which must be manufactured and then handled during assembly increases the cost.

SUMMARY OF THE INVENTION

To at least partially overcome these disadvantages of previously known devices, the present invention provides in one aspect, a piston pump assembly in which a piston-forming element to be received in a piston chamber of a piston chamber-forming member carries a removable stop flange member which may be secured to the piston chamber-forming member to provide a retention stop to prevent the piston-forming element from being removed from the piston chamber.

To overcome other disadvantages of the previously known devices, the present invention provides in another aspect a removable closure for an outlet for a piston for a piston pump which is removable.

An object of the present invention is to provide a novel piston for a piston pump.

Another object is to provide a piston for a piston pump in which the piston carries a removable stop member which is severable from the piston member preferably by breaking a frangible connection and adapted to be engaged relative a piston chamber to prevent removal of the piston-forming element from the piston chamber.

Another object is to provide a method of manufacture and/or assembly of a piston pump.

Another object is to provide a method for preparation and/or use of a fluid containing reservoir including a piston pump.

In one aspect, the present invention provides a pump for dispensing fluids comprising:

a piston chamber-forming member having a chamber about a chamber axis, the chamber having a chamber wall, an inner end, an open outer end, an outlet and an inlet, a piston-forming-element during operation to pump fluid being received in the piston-chamber-forming member axially slidable inwardly and outwardly therein between an extended position and a retracted position in cyclical operation of the pump to draw fluid into the chamber via the inlet and dispense fluid via the outlet, the piston-forming element having an inner end and an outer end, the inner end of the piston-forming element located in the chamber with the piston-forming element extending axially in the chamber from the inner end outwardly from the chamber through the open outer end outwardly to the outer end, the piston-forming element having an inner stop flange member on the piston-forming element, the inner stop flange member having an axially outwardly directed stop surface, the piston-forming element having an outer stop flange member on the piston-forming element outwardly from the inner stop flange member, the outer stop flange member having an axially inwardly directed stop surface, the outer stop flange member removably coupled to the piston-forming element by a frangible bridge member, the frangible bridge member being severable to separate the outer stop flange member from the piston-forming element, the chamber having a fixation portion to engage with the outer stop flange member for facilitating fixedly securing of the outer stop flange member to the piston-chamber-forming member, wherein with the outer stop flange member coupled to the piston-forming element, in a transfer position the piston forming element is located in the chamber with the fixation portion engaging the outer stop flange member, wherein in the transfer position the fixation portion and the outer stop flange member are adapted to be fixedly secured together against relative axial movement, wherein in the transfer position after the fixation portion and the outer stop flange member have been fixedly secured together against relative axial movement, the outer end of the piston-forming element is movable relative the piston chamber-forming member to sever the frangible bridge member thereby separating the outer stop flange member from the piston forming element, wherein after the fixation portion and the outer stop flange member have been fixedly secured together against relative axial movement and the outer stop flange member has been severed from the piston-forming element, the outer stop flange member extending radially inwardly from the chamber wall presenting the axially inwardly directed stop surface axially opposed to the axially outwardly directed stop surface on the inner stop flange member and engagement between the axially inwardly directed stop surface and the axially outwardly directed stop surface prevents sliding of the piston-forming element outwardly in the piston chamber-forming member past the outer stop flange member.

In another aspect, the present invention provides a method of making a pump for dispensing fluids comprising:

(a) providing a piston chamber-forming member having a chamber about a chamber axis, the chamber having a chamber wall, an inner end, an open outer end, an outlet and an inlet, (b) providing a piston-forming element adapted to be received in the piston-chamber-forming member axially slidable inwardly and outwardly therein between an extended position and a retracted position in cyclical operation of the pump to draw fluid into the chamber via the inlet and dispense fluid via the outlet, a piston-forming element during operation to pump fluid being received in the piston chamber-forming member axially slidable inwardly and outwardly therein between an extended position and a retracted position in cyclical operation of the pump to draw fluid into the chamber via the inlet and dispense fluid via the outlet, the piston-forming element having an inner end and an outer end, the inner end of the piston-forming element located in the chamber with the piston forming element extending axially in the chamber from the inner end outwardly from the chamber through the open outer end outwardly to the outer end, the piston-forming element having an inner stop flange member on the piston-forming element, the inner stop flange member having an axially outwardly directed stop surface, the piston-forming element having an outer stop flange member on the piston forming element outwardly from the inner stop flange member, the outer stop flange member having an axially inwardly directed stop surface, the outer stop flange member removably coupled to the piston-forming element by a frangible bridge member, the frangible bridge member being severable to separate the outer stop flange member from the piston forming element, the chamber having a fixation portion to engage with the outer stop flange member for facilitating fixedly securing of the outer stop flange member to the piston chamber-forming member, (c) sliding the piston forming element axially into the piston chamber-forming member to a transfer position in which the piston-forming element is located in the chamber with the fixation portion engaging the outer stop flange member, (d) coupling the outer stop flange member to the piston-forming element in the transfer position to fixedly secure the fixation portion and the outer stop flange member together against relative axial movement, (e) after the fixation portion and the outer stop flange member have been fixedly secured together against relative axial movement, moving the outer end of the piston-forming element relative the piston chamber-forming member to sever the frangible bridge member thereby separating the outer stop flange member from the piston-forming element, and wherein after the fixation portion and the outer stop flange member have been fixedly secured together against relative axial movement and the outer stop flange member has been severed from the piston-forming element, the outer stop flange member extending radially inwardly from the chamber wall presenting the axially inwardly directed stop surface axially opposed to the axially outwardly directed stop surface on the inner stop flange member and engagement between the axially inwardly directed stop surface and the axially outwardly directed stop surface prevents sliding of the piston-forming element outwardly in the piston chamber-forming member past the outer stop flange member.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 7:
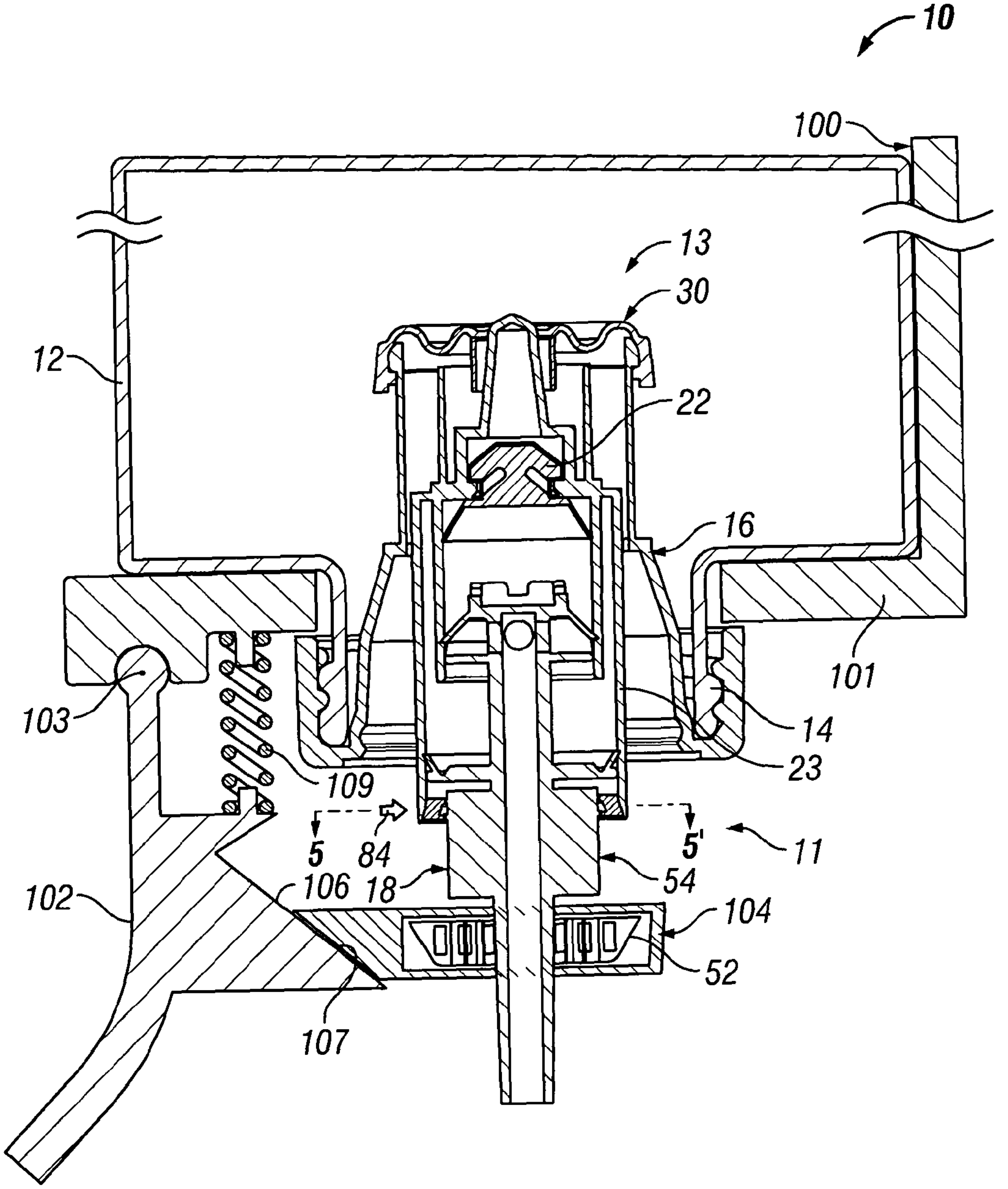
FIG. 7 is an axial cross-sectional view of the pump assembly shown in FIG. 1 coupled to a fluid filled reservoir secured in a dispenser.

Reference is made first to FIG. 7 which shows a liquid dispenser 10 in accordance with the present invention having a pump assembly 11 attached to a reservoir 12. The pump assembly of FIG. 7 has a configuration substantially as disclosed in FIG. 3 of U.S. Pat. No. 7,267,251 to Ophardt, issued Sep. 11, 2007 (which is incorporated herein by reference) but including a vacuum relief valve device 13 mounted coaxially with the pump assembly 11 inwardly of the pump assembly substantially as disclosed in FIG. 22 of U.S. Pat. No. 7,377,405 to Ophardt, issued May 27, 2008 (which is incorporated herein by reference).

The reservoir 12 is a rigid bottle with a threaded neck 14. The pump assembly 11 has a piston chamber-forming body 16 defining a piston chamber 17 therein in which a piston-forming element or piston 18 is slidably disposed for reciprocal movement to dispense fluid from the reservoir 12. An opening 19 in the end wall 20 of the piston chamber 17 is in communication with the fluid in the reservoir 12 via a radially extending passageway 21 best seen in FIG. 2. A one-way valve 22 across the opening 19 permits fluid flow outwardly from the passageway 21 into the chamber 17 but prevents fluid flow inwardly.

The piston chamber-forming body 16 has a cylindrical intermediate tube 23 defining the chamber 17 therein. An outer tube 24 is provided radially outwardly of the intermediate tube 23 joined by a radially extending shoulder 25 to the intermediate tube 23. The outer tube 24 extends outwardly so as to define an annular air space 99 between the outer tube 24 and the intermediate tube 23. The outer tube 24 carries threaded flange 26 which engages the threaded neck 27 of the reservoir 12 to form a fluid impermeable seal therewith.

The vacuum relief device 13 in FIG. 7 has a coaxial upstanding side wall 28 and an upstanding male valve seat member 29. A cap 30 sealably secured to the upper end of the side wall 28 carries an annular female seat member 31 which is biased into sealed engagement with the male valve seat member 29. When a vacuum condition exists in the reservoir 12, the female valve seat member 31 will be displaced off the male valve seat member 29 to let atmospheric air flow into the reservoir 12 from air apertures 32 which provide communication between an annular air chamber 33 under the cap 30 and the annular air space 99 which is open to atmospheric air. The apertures 32 extend through the shoulder 25 joining the intermediate tube 23 to the outer tube 24. Fluid from the reservoir 12 is in communication via passageway 21 and to the opening 19 to the piston chamber 17.

The piston chamber-forming body 16 is preferably injection moulded as a unitary element including the vacuum relief device other than its cap 30 which is preferably formed as a separate injection moulded element. The one-way valve 22 and the piston-forming element 18 are shown as separate elements.

The piston chamber-forming body 16 has a cylindrical inner tube 35 coaxially inside the intermediate tube 23 which extends outwardly from the end wall 20 and terminates at an open end 36 axially inwardly from an open end 37 of the intermediate tube 23. The inner tube 35 serves to define within the chamber 17 an inner chamber portion 38 of a reduced diameter than an outer chamber portion 39 outwardly of the inner chamber portion 38.

The one-way valve 22 has a shouldered button 33 which is secured in a snap-fit inside a central opening in the end wall 20 of the chamber 17, a flexible annular rim 98 is carried by the button 33 and extends radially outwardly to engage the side wall 97 of the inner tube 35. When the pressure in passageway 21 is greater than pressure in chamber 17, the rim 98 is deflected away from the side wall 97 of the inner tube 35 and fluid may flow from passageway 21 through exit opening 19 in the end wall 20 and past the rim 98 into the chamber 17. Fluid flow in the opposite direction is blocked by rim 98.

Figure 2:
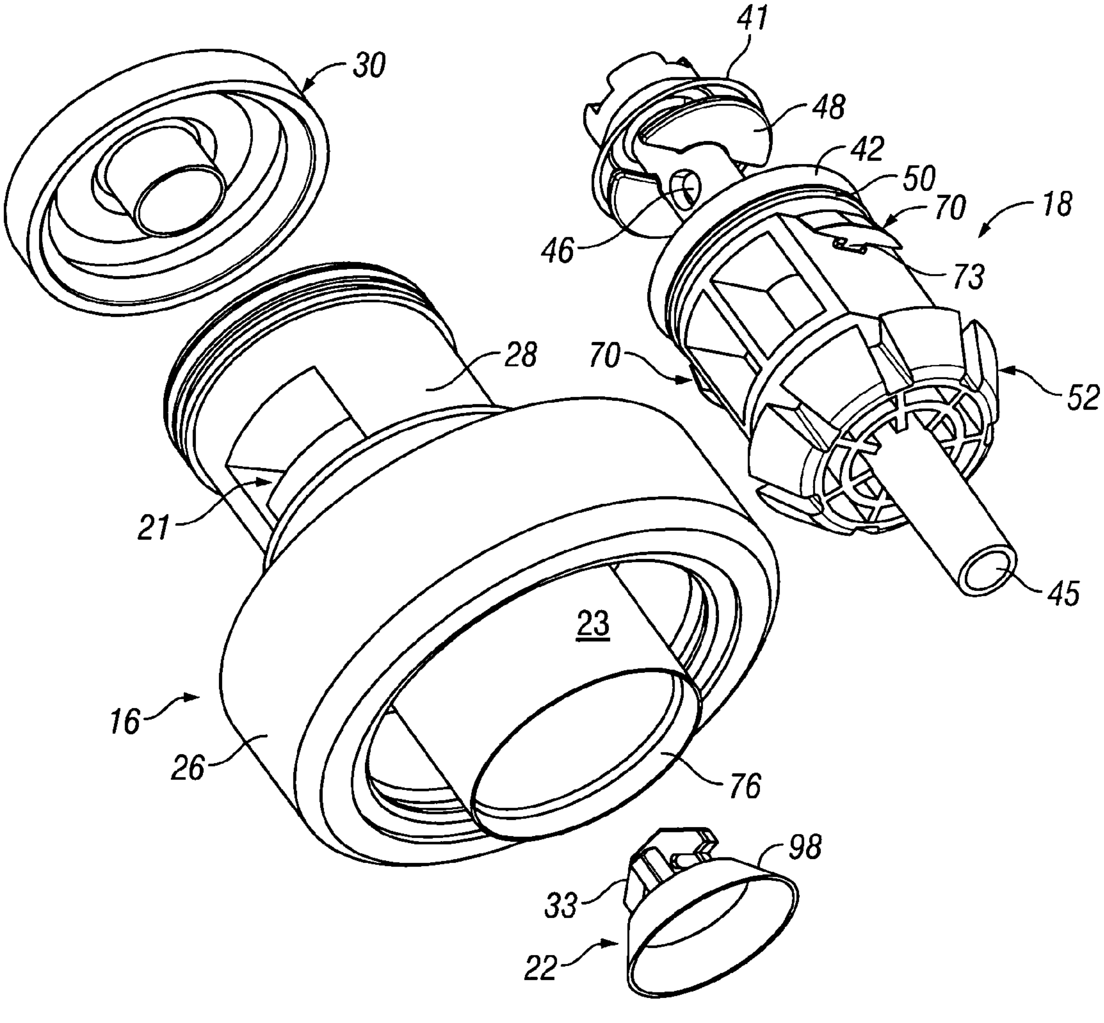
FIG. 2 is an exploded pictorial view of the pump assembly shown in FIG. 1.
Figure 3:
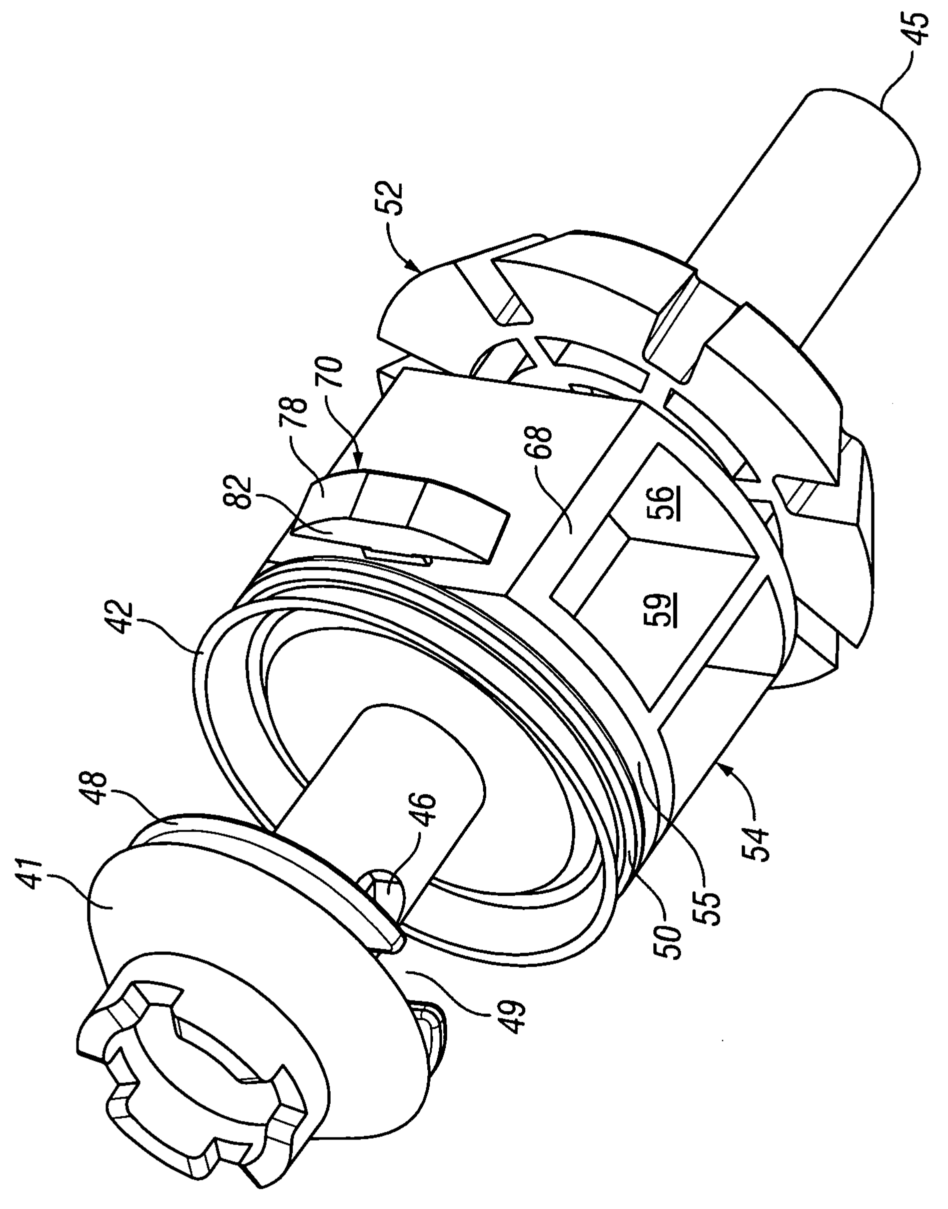
FIG. 3 is a pictorial view of a piston-forming element in FIG. 1.
Figure 10:
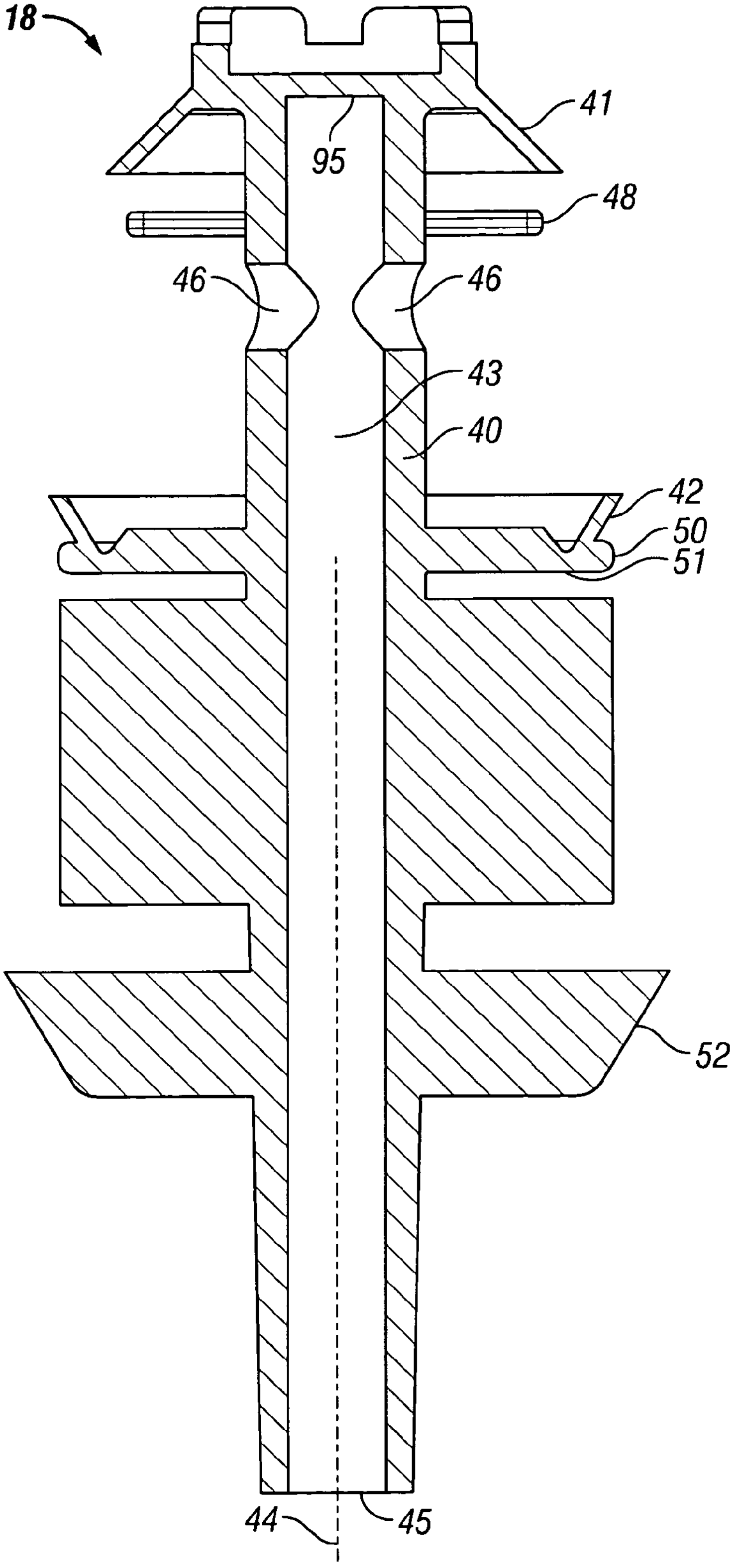
FIG. 10 is an axial cross-sectional side view of the piston shown in FIG. 3 but in an axial cross-sectional plane normal to the cross-sectional plane in FIG. 7.

The piston-forming element or piston 18 is a preferably unitary element formed of plastic as best seen in FIGS. 2, 3 and 10. The piston 18 has a hollow stem 40. A circular inner disc 41 and a circular outer disc 42 are located on the stem 40 spaced from each other. The inner disc 41 resiliently engages the side wall 97 of the inner tube 35 in the inner chamber portion 38 to permit fluid flow outwardly therepast but to restrict fluid flow inwardly. The outer disc 42 engages the side wall 96 of the intermediate tube 23 in the outer chamber portion 39 to prevent fluid flow outwardly therepast.

The piston stem 40 has a hollow passageway 43 extending along an axis 44 of the piston 18 from a blind inner end 95 to an outlet 45 at an outer end. Inlets 46 to the passageway 43 are provided through the wall of the stem 40 between the inner disc 41 and outer disc 42. By reciprocal movement of the piston 18 in the chamber 17, fluid is drawn from passageway 21 through exit opening 19 past the one-way valve 22 and via the inlets 46 through the passageway 43 to exit the outlet 45.

As fluid is pumped from the reservoir 12, a vacuum may be developed in the reservoir and the pressure relief valve 13 may permit air to enter the reservoir 12.

Reference is made to FIG. 3 showing the piston 18. An annular inner locating flange 48 is provided extending radially outwardly from the stem 40 outwardly of the inner disc 41 between the inner disc 41 and the inlet 46. The inner locating flange 48 has a radially extending slot 49 axially therethrough. The inner locating flange 48, while unnecessary, serves the purpose of providing sliding engagement with the side wall 97 of the inner tube 35 to assist in coaxially slidably locating the piston 18 coaxially within the chamber 17 of the piston chamber-forming body 16.

As seen in FIG. 3, the piston 18 carries on the stem 40 an inner stop flange member 50. The inner stop flange member 50 has a radially outwardly directed surface for sliding engagement with the side wall 96 of the intermediate tube 23 to assist in coaxially locating the piston 18 within the piston chamber-forming body 16. The inner stop flange member 50 includes an axially outwardly directed stop surface 51.

As seen in FIG. 3, the piston 18 carries on the stem 40 an engagement flange 52. The engagement flange 52 is adapted for engagement by an activation mechanism on the dispenser 10 in a manner as seen in FIG. 7. Such an engagement flange 52 is known to be provided on the piston 18 outwardly of the piston chamber-forming member 16 and adapted for engagement as by a portion of an actuator member which actuator member on movement relative to a housing of a dispenser may move the piston 18 coaxially relative to the piston chamber-forming member 16 in a cycle of operation to displace fluid. Known mechanisms for coupling the engagement flange 52 to an actuator member are disclosed, for example, in U.S. Pat. No. 5,431,309 to Ophardt issued Jul. 11, 1995, the disclosure of which is incorporated herein by reference. In FIG. 7, a dispenser housing 100 is shown having a support plate 101 to support the reservoir 12 and a lever 102 pivotally mounted thereto for pivoting about a pivot axis 103. The housing 100 includes a catch member 104 only schematically illustrated to removably engage the engagement flange 52. Pivoting of the lever 102 clockwise moves a wedge camming surface 106 on the lever 102 to engage a camming surface 107 on the catch member 104 urging the catch member 104 and therefore the piston 18 upwardly relative to the piston chamber-forming member 16 against the bias of a return spring 109.

Figure 4:
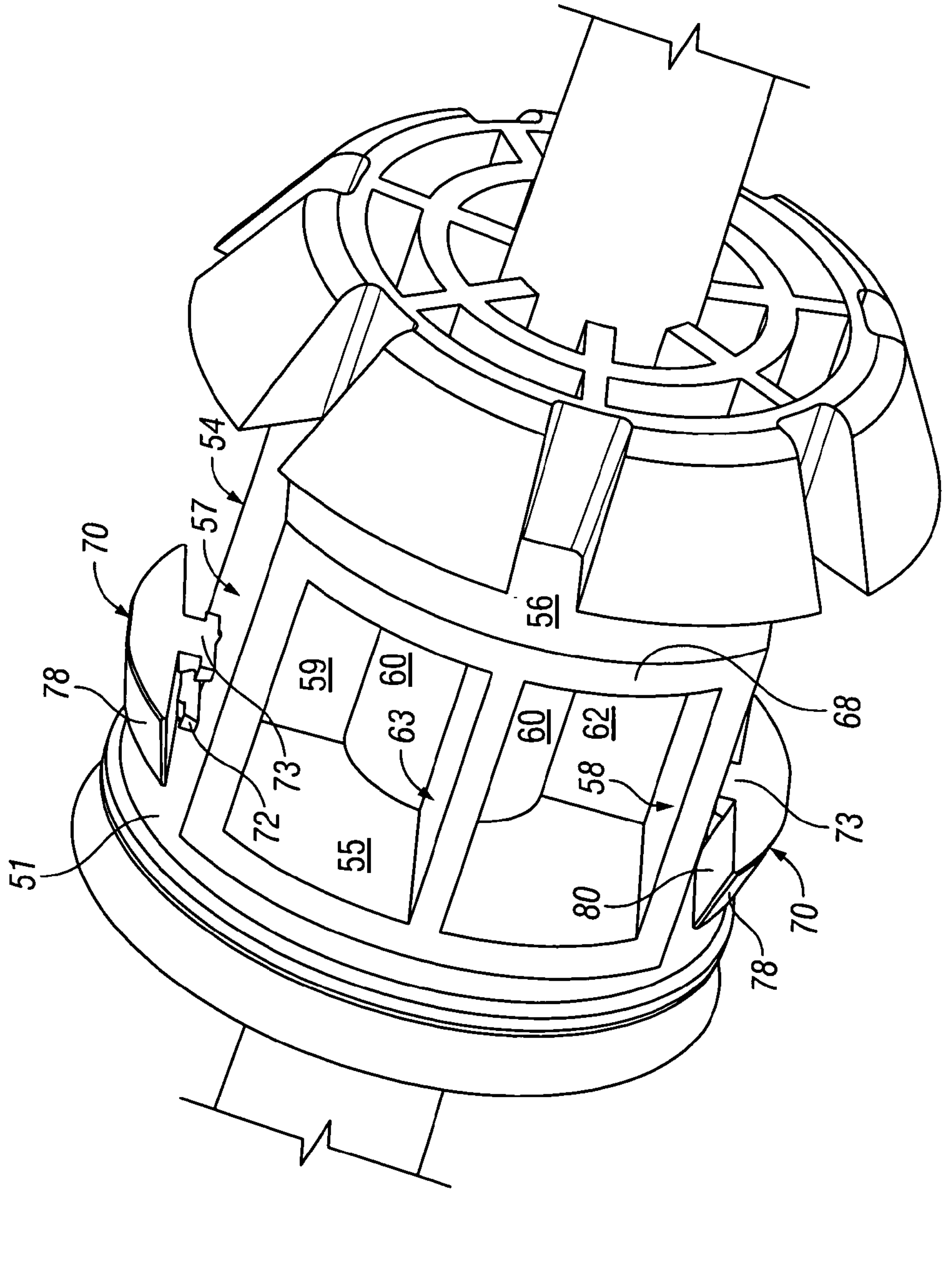
FIG. 4 is an enlarged pictorial view showing a middle portion of the piston-forming element shown in FIG. 3.
Figure 5:
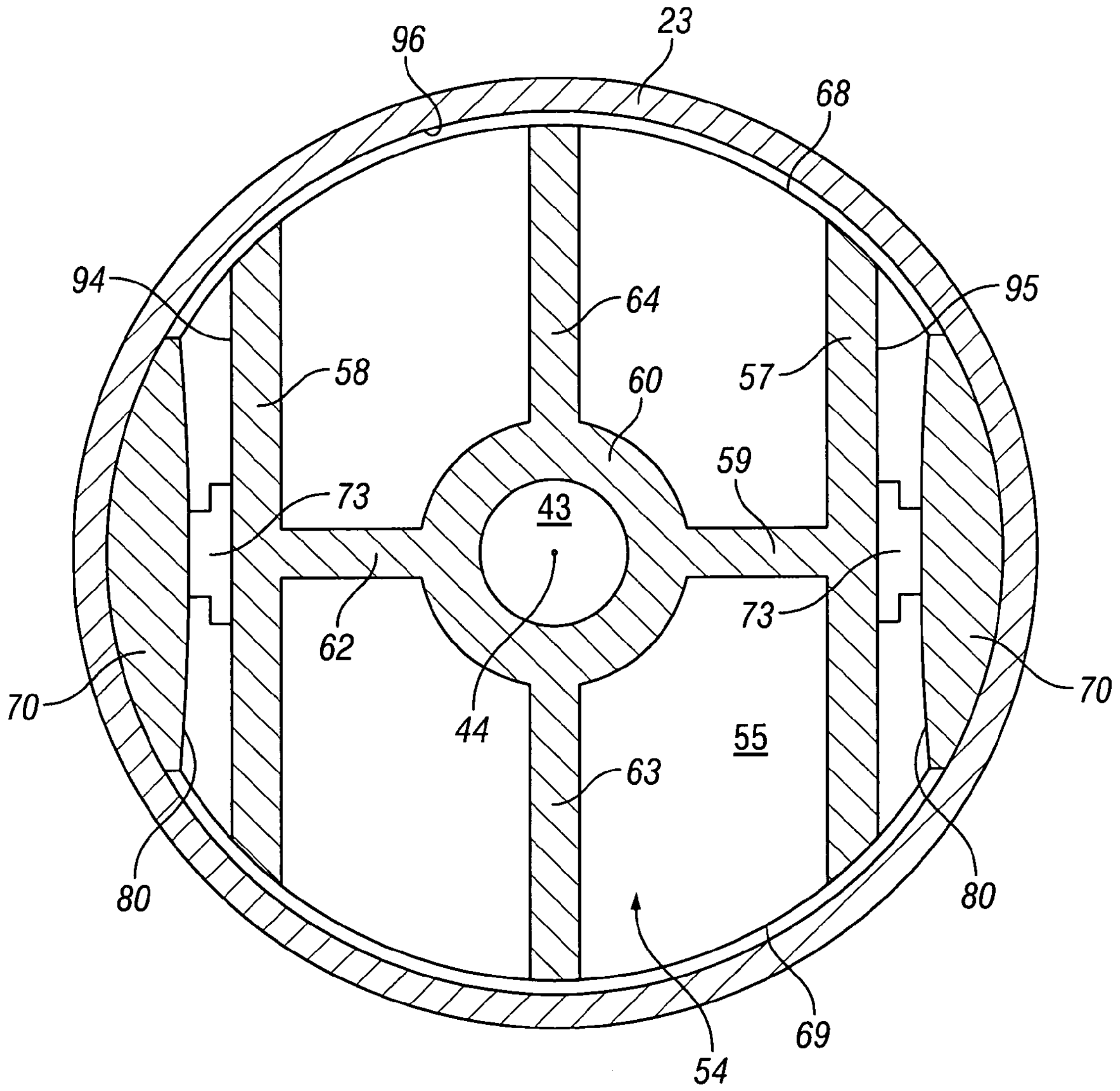
FIG. 5 is a radial cross-sectional view of the piston-forming element shown in FIG. 3 through the stop members.

As seen in FIGS. 3, 4 and 5, between the inner stop flange member 50 and the engagement flange 52, the stem 40 includes a key guide member 54. The key guide member 54 has an inner end plate 55 at an inner axial end and an outer end plate 56 at an outer axial end. The key guide member 54 has a first side plate 57 at one radial side and a second side plate 58 at an opposite side opposite to the first side plate 57. A first support vane 59 extends from a cylindrical wall 60 of a tube 61 forming the stem 40 radially and axially to the first side plate 57. Similarly, a second support vane 62 extends radially and axially between the tube 61 and the second side plate 58. A first locating vane 63 extends from the tube 61 radially parallel to the first side plate 57 and the second side plate 58. A second locating vane 64 extends radially from the tube 61 in an opposite direction from the first locating vane 63 parallel to the first side plate 57 and a second side plate 58. Each of the support vanes 59 and 60 and the locating vanes 63 and 64 extend axially between the inner end plate 55 and the outer end plate 56.

The key guide member 54 has first arcuate guide surfaces 68 at one radial end and second arcuate guide surfaces 69 at the other radial end. The first arcuate guide surfaces 68 as seen in FIG. 4 comprise radially directed end surfaces on the inner end plate 55, the outer end plate 56, the first side plate 57, the second side plate 58 and the first locating vane 63. The second arcuate guide surface 69 comprises radially directed end surfaces on the inner plate 55, the outer plate 56, the first side plate 57, the second side plate 50 and the second locating guide 64. The first arcuate guide surfaces 58 and the second arcuate guide surfaces 59 are disposed in a cylindrical plane at a constant radius coaxially about the axis 44 of the piston 18 as seen, for example, in FIG. 5. The first side plate 57 has a generally flat planar locating surface 95 on one radial side of the key guide member 54. The second side plate 58 has a generally flat planar locating surface 94 on an opposite radial side of the key guide member 54. Two outer stop members 70 are provided on the piston 18 radially outwardly of the key guide member 54. Each stop member 70 is secured respectively to the locating surfaces 95 and 96 of the first side plate 57 and the second side plate 58 by two axially spaced frangible bridge members 72 and 73. In this regard, as best seen in FIG. 4, a first outer stop member 70 is radially outwardly of the first side plate 57 with each of the bridge members 72 and 73 securing the first outer stop member 70 to the first side plate 57 and spacing the outer stop member 70 from the first side plate 57. A second outer stop member 70 is radially outward of the second side plate 58 with its two bridge members 72 and 73 securing the second outer stop member 70 to the second side plate 58 and spacing the outer stop member 71 from the second side plate 58.

Figure 6:
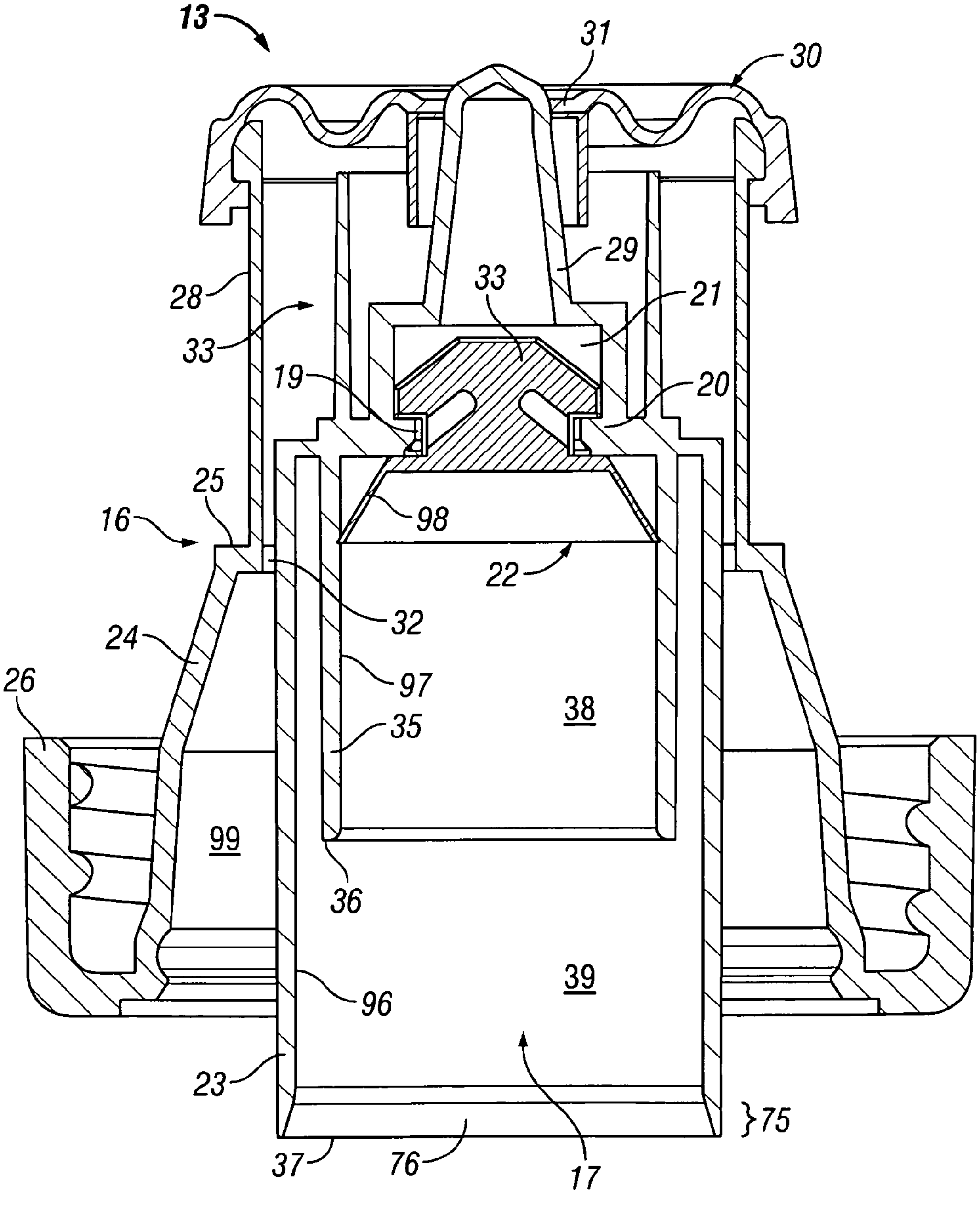
FIG. 6 is an axial cross-sectional view of the piston chamber-forming body shown in FIG. 1.

Referring to FIG. 6, the intermediate tube 23 has at its open end 37, an annular fixation portion 75 with a frustoconical surface 76 directed radially inwardly and axially outwardly.

Each of the outer stop members 70 has a frustoconical stop surface 78 directed radially outwardly and axially inwardly which is complementary to the frustoconical surface 76 on the fixation portion 75 of the intermediate tube 23. Each of the outer stop members 70 carries a radially inwardly directed stop surface 80 and an axially inwardly directed stop surface 82.

Figure 1:
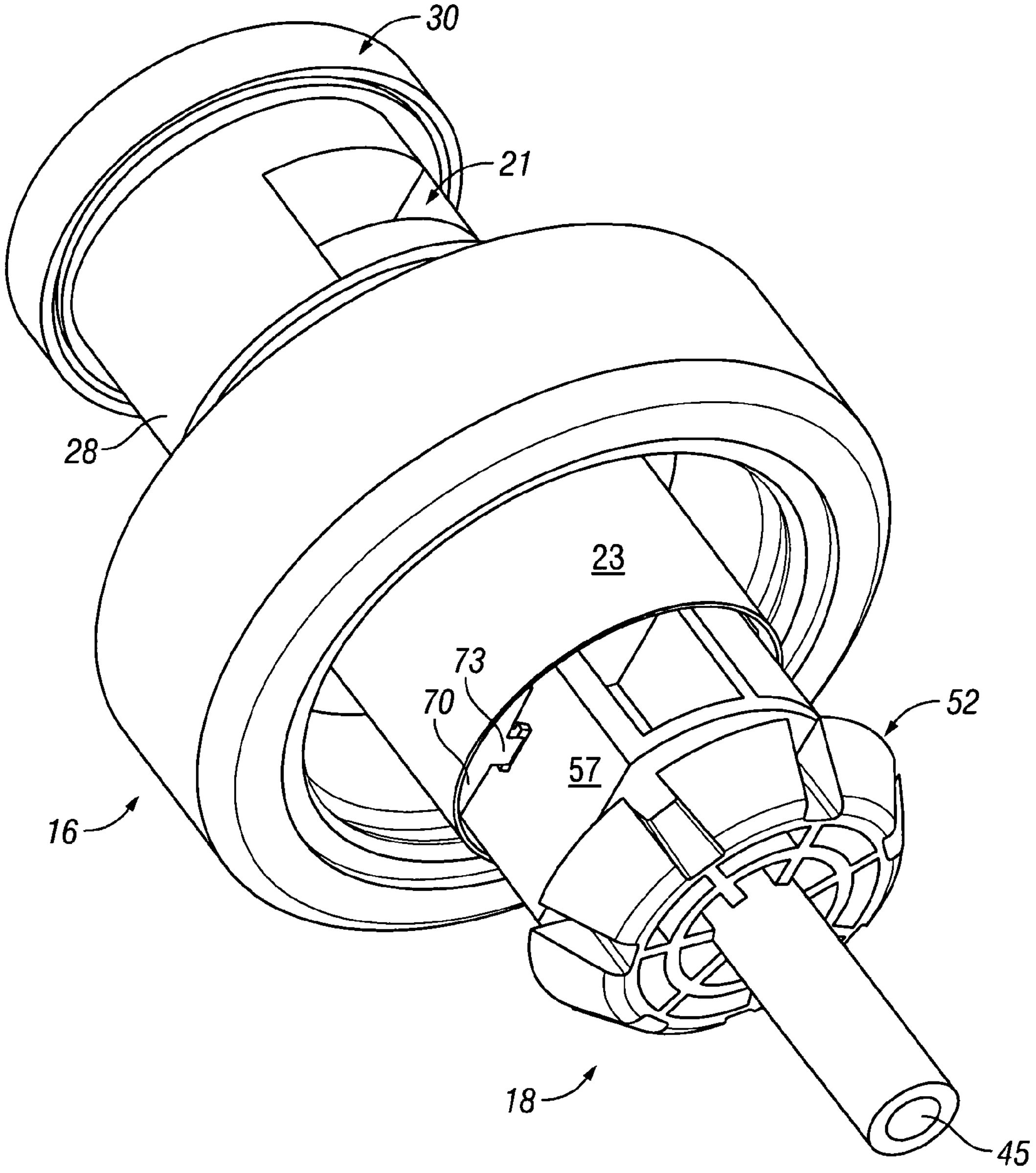
FIG. 1 is a pictorial view of a pump assembly in accordance with a first embodiment of the present invention with a piston-forming element in a transfer position.

The piston 18 as shown in FIG. 3 is manufactured with the outer stop members 70 integrally formed on the key guide member 54 of the stem 40. The pump assembly 10 is assembled in the following manner. The piston 18 is inserted into the piston chamber-forming member 16 with the piston 18 coaxially located within the chamber 17 with the inner disc 41 coaxially within the inner tube 35 and the outer disc 42 coaxially within the intermediate tube 23. The piston 18 coaxially located relative to the chamber 17 is slid inwardly into the piston chamber 17 coaxially relative to the piston chamber-forming body 18 until the outer stop members 70 engage the fixation portion 75 on the intermediate tube 23 locating the piston 18 in a transfer position as seen in FIGS. 1 and 7. The piston 18 is in the transfer position when the frustoconical stop surfaces 78 on the outer stop members 70 engage the frustoconical surface 76 of the fixation portion 75 on the intermediate tube 23.

While the piston element 18 held in the transfer position relative to the piston chamber-forming body 16, each of the outer stop members 70 are fixedly secured to the fixation portion 75. A preferred manner of securely fixing the outer stop members 70 to the fixation portion 75 is to weld the frustoconical surfaces 78 of the outer stop members 70 to the frustoconical surface 76 of the fixation portion 75. One preferred method of welding these frustoconical surfaces together is, with the piston 18 in the transfer position as shown in FIG. 7, to direct laser energy as in the manner of the arrow 84 indicated in FIG. 7 radially into the intermediate tube 23 at locations annularly about the fixation portion where the outer stop members 70 are found. In a preferred arrangement, the intermediate tube 23 and particularly its fixation portion 75 may be made of a plastic that is substantially transmissive to the laser energy directed. In contrast, the outer stop members 70 may be formed of a plastic which is absorbent to the laser energy. The outer stop members 70 absorb the laser energy directed, and have their frustoconical surfaces 78 heated to above a melting temperature so as to each be welded to the frustoconical surface 56 of the fixation portion 75. Plastic from which the outer stop members 70 may be formed may be a plastic including a colorant, such as a black colorant, which would absorb the laser energy. The black colorant could be provided as part of the plastic forming the entirety of the piston 18 or it could alternately be a coating applied to the frustoconical surfaces 78 of the outer stop members 70. For example, low density polyethylene including a black colorant has been found useful as a material for the piston 18 to provide the outer stop members 70 with adequate laser energy absorbing capacity. The piston chamber-forming member 16 and its intermediate tube 23 may comprise relatively opaque high density polyethylene without colorants which has been found satisfactory to provide adequate transmission of laser energy to the interface between the outer stop members 70 and the fixation portion 75.

For laser welding, it is possible to use colorants on or in only one of or both of the outer stop members and the fixation portion. The laser energy need not merely be applied radially but could also be applied axially as, for example, axially inwardly onto the outer stop members 70 and 71 as indicated by the arrows 85. The preferred laser welding may be carried out at a number of specific points or over the full surface of the frustoconical surfaces 78.

With the piston 18 in the transfer position as shown in FIG. 7 and the outer stop members 70 fixedly secured to the piston chamber-forming member 16, the piston 18 is then moved relative to the piston chamber-forming member 16 so as to sever the frangible bridge members 72 and 73 joining the outer stop members 70 to the key guide member 54. As seen in the drawings and, notably FIGS. 4 and 5, the bridge members 72 and 73 provide a relatively small cross-sectional area of plastic material. The bridge members 72 and 73 may be broken by applying across the bridge members sufficient force to sever the bridge members. The forces applied to sever the bridge members may be applied axially and/or radially but preferably are applied axially by urging the piston 18 axially relative to the piston chamber-forming body 16, preferably axially inwardly. The piston 18 may be rotated relative the piston chamber-forming member 16 to sever the bridge members or a combination of axial and rotational movement may be used to sever the bridge members. The relative size of the bridge members 72 and 73 may be selected having regard to the nature of the plastic material from which they are formed so as to select reasonable forces which are required to be applied across the bridge members so as to sever them. Such forces may preferably be selected to be forces which can readily be applied manually as by a user engaging portions of the piston 18 which extend outwardly from the piston chamber-forming body 16.

Figure 8:
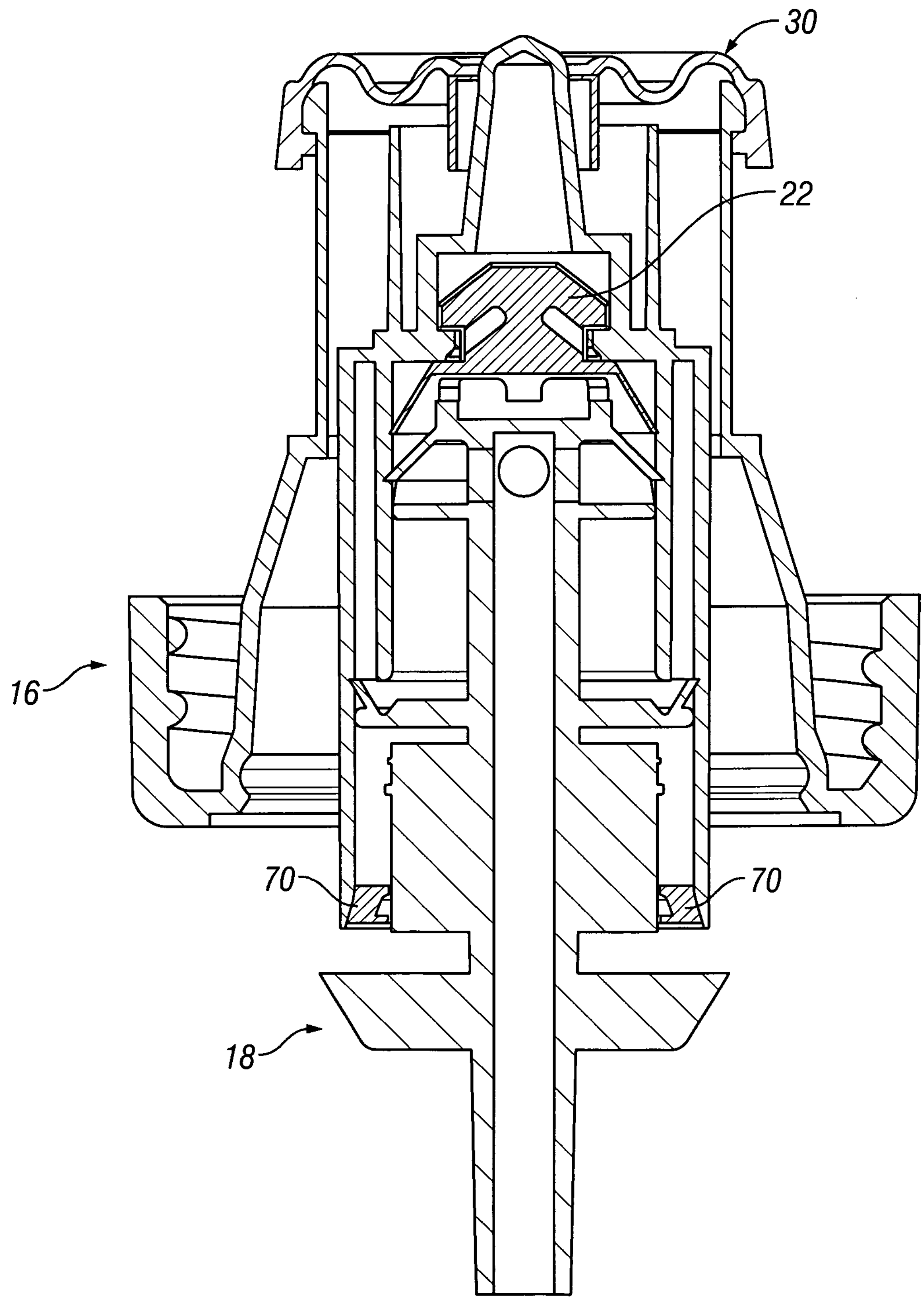
FIG. 8 is a cross-sectional view of the pump assembly as shown in FIG. 7 but with the piston-forming element severed from its stop member and with the piston-forming element in a fully retracted position.
Figure 9:
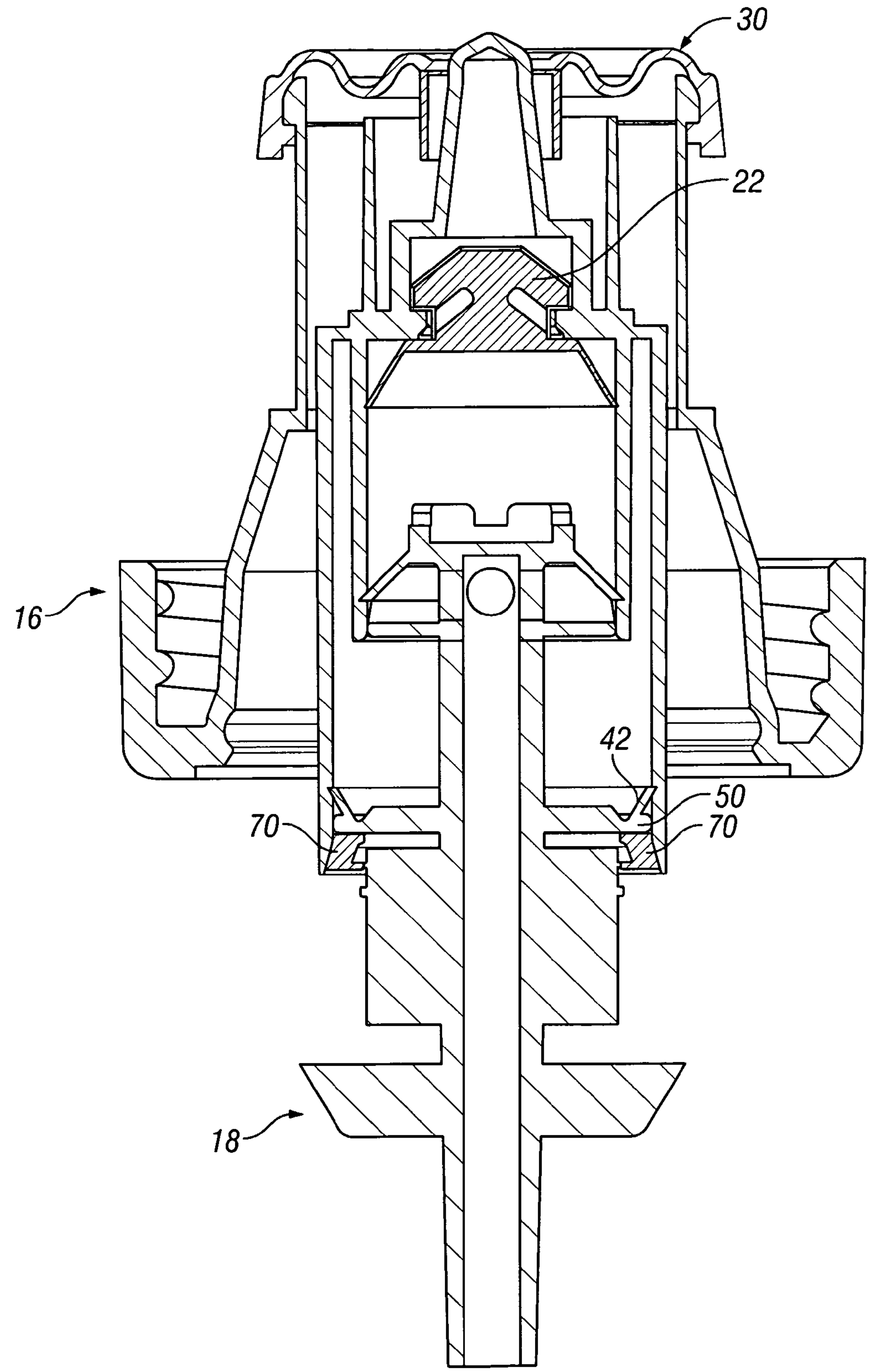
FIG. 9 is a cross-sectional view of the pump assembly as shown in FIG. 8 but with the piston-forming element in a fully extended position.

With the outer stop members 70 fixedly secured to the fixation portion 75 and the bridge members 72 and 73 severed, the piston 18 is slidable relative to the piston chamber-forming member 16 as between a fully retracted position as shown in FIG. 8 and a fully extended position as shown in FIG. 9. A cycle of operation of the pump assembly preferably includes movement in a retraction stroke from the extended position of FIG. 9 to the retracted position of FIG. 8 so as to discharge fluid outwardly from the chamber 17 out the outlet 45 followed by movement in a withdrawal stroke from the retracted position of FIG. 8 to the extended position of FIG. 9 so as to draw fluid from the reservoir 12 outwardly into the chamber 17. In the preferred embodiment illustrated with the inner tube 35 and its inner chamber portion 38 of a smaller diameter than the intermediate tube 23 and its outer chamber portion 39, in the withdrawal stroke there is a withdrawal of fluid within the passageway 43 of the hollow stem 40 back into the chamber 17 as can be advantageous to prevent dripping between strokes.

With the outer stop members 70 fixedly secured to the fixation portion 75, the axially inwardly directed stop surfaces 82 are axially opposed to the axially outwardly directed stop surface 51 on the inner stop flange member 50 of the piston 18. On moving the piston 18 outwardly relative to the piston chamber-forming body 16, engagement between the axially inwardly directed stop surfaces 82 of the stop members 70 and the axially outwardly directed stop surface 51 on the inner stop flange member 50 prevents sliding of the piston 18 outwardly in the piston chamber-forming body 16 past the fully extended position as seen in FIG. 9.

As best seen in FIG. 5, the guide key member 54 has first arcuate guide surfaces 68 at one radial end and second arcuate guide surfaces 69 at the other end. These arcuate guide surfaces 68 and 69 are sized to be closely adjacent to the side wall 96 of the intermediate tube 23 to assist in maintaining the piston 18 coaxially within the piston chamber 17.

As seen in FIG. 5, each of the outer stop members 70 present a radially inwardly directed stop surface 80. These radially inwardly directed stop surfaces 80 are in opposition to the locating surfaces 94 and 95 of the first side plate 57 and the second side plate 58 of the key guide member 54. With the bridge members 72 and 73 secured to the piston chamber-forming body 16 on relative rotation of the piston 18 about the axis 44 relative to the piston chamber-forming body 16, such rotation will place the locating surfaces 94 and 95 into engagement with the radially inwardly directed stop surfaces 80 of the outer stop members 70 thus restricting rotation of the piston 18 relative to the piston chamber-forming body 16. In accordance with the preferred embodiment, in all positions of the piston 18 between the fully retracted position shown in FIG. 8 and the fully retracted position shown in FIG. 9, the stop members 70 and their radially inwardly directed stop surfaces 80 are located radially outwardly from the first side plate 57 and the second side plate 58 so as to restrict relative rotation of the piston 18 within the piston chamber-forming body 16. Restricting the piston 18 from rotation relative the piston chamber-forming body 16 is not necessary, however, it can be preferred for a number of different applications. For example, in one application, it may be preferred to fixedly secure the piston chamber-forming body 16 to the reservoir 12 at a particular angular orientation on the reservoir. Subsequently, with proper and relative insertion of the piston 18 into the piston chamber-forming body 16 in a desired rotational position about the axis, the stop members 70 may then be secured to the piston chamber-forming body 16 at desired positions relative to the axis which will have the effect of orientating the piston 18 substantially against rotation at a desired position relative to the piston chamber-forming body 16 and the reservoir. The reservoir 12 may similarly be fixedly secured to the dispenser housing 100 against rotation. As a result, for example, in the situation in which the piston 18 may have its discharge outlet directed, for example, at a desired angle radially relative to the piston axis 44, the piston 18 may be fixed in an orientation which is desired relative to the piston chamber-forming body 16, the reservoir 60 and the dispenser in housing 100.

Figure 11:
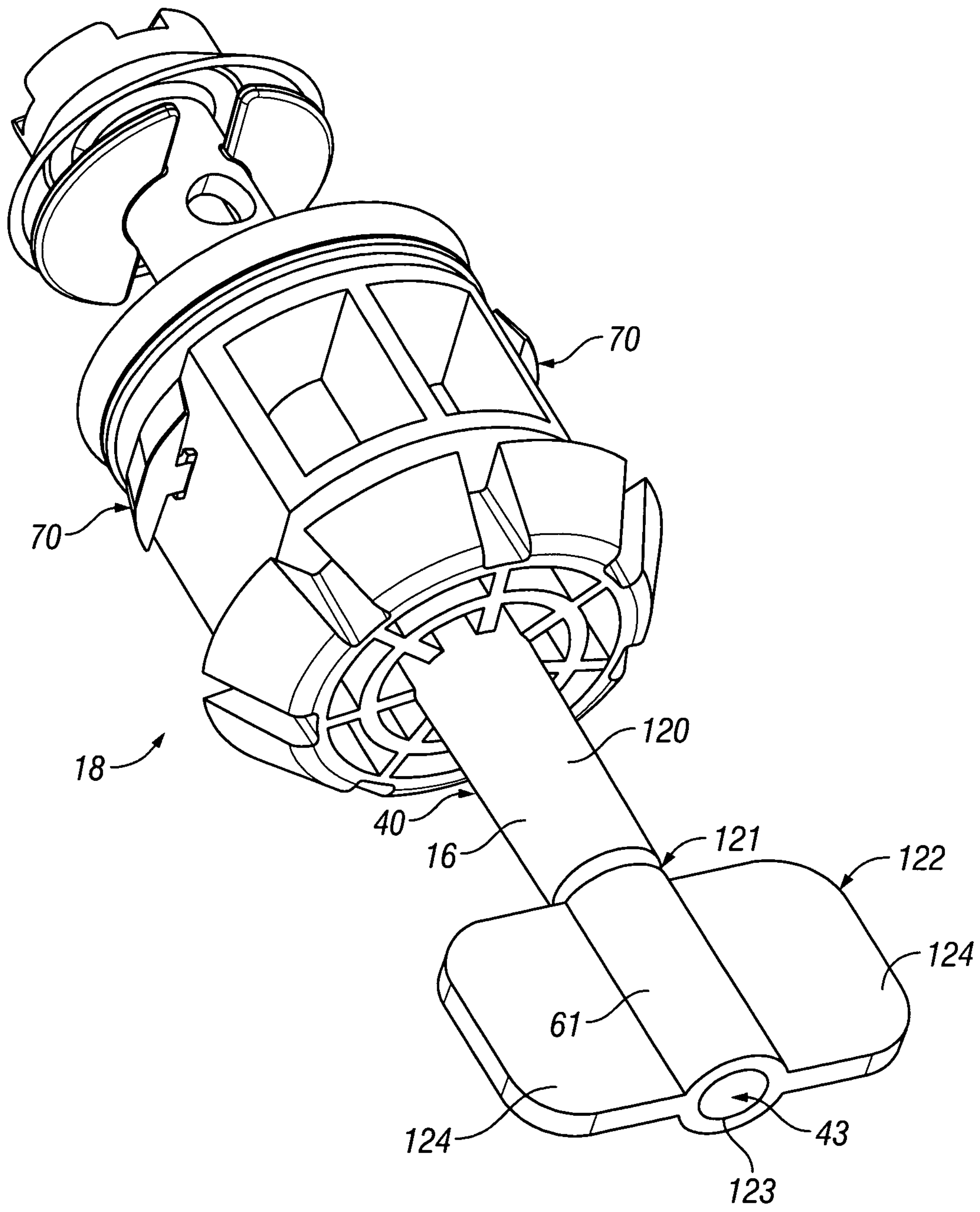
FIG. 11 is a pictorial view of a piston-forming element in accordance with the second embodiment of the present invention as injection moulded.
Figure 12:
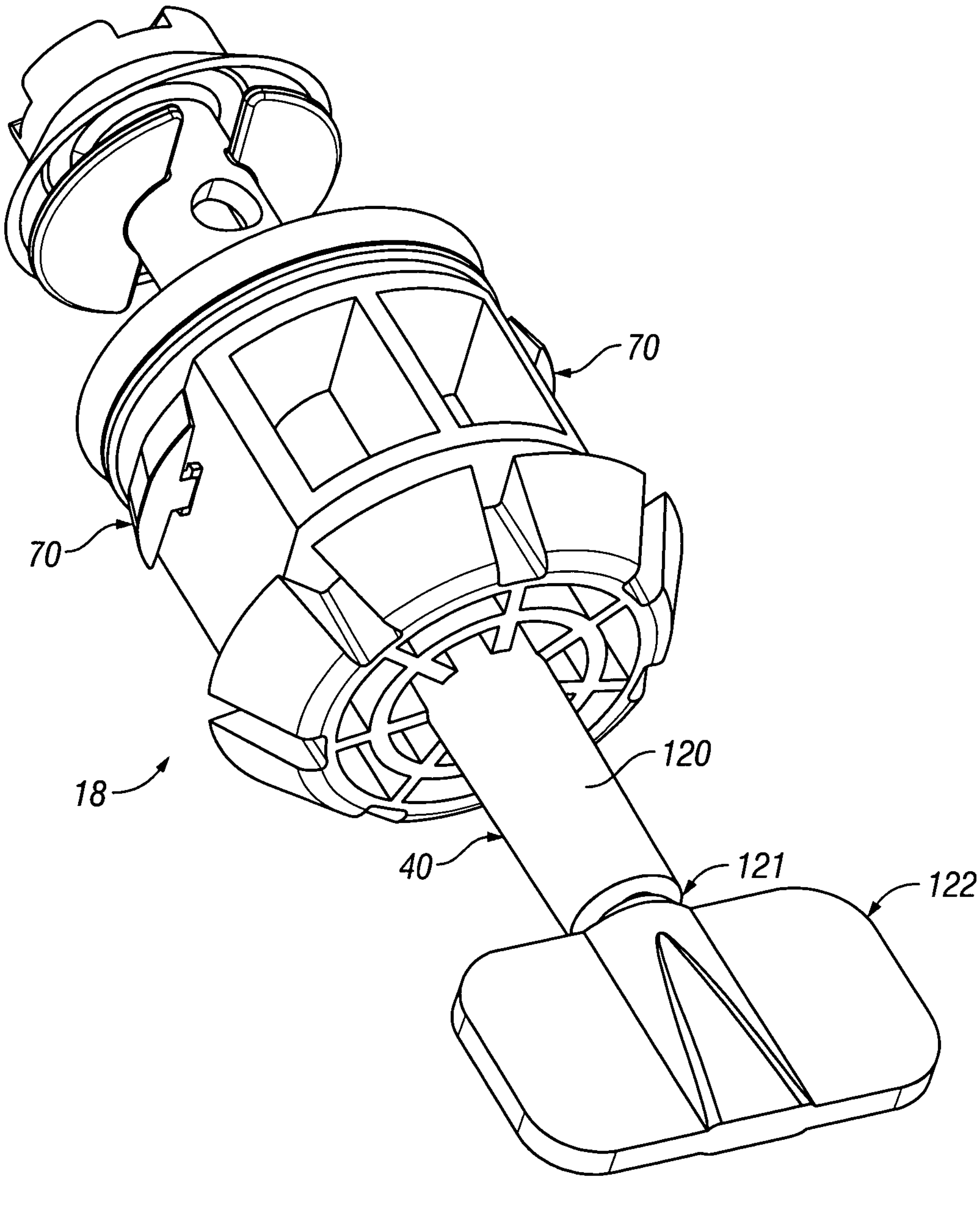
FIG. 12 is a pictorial view of the piston-forming element shown in FIG. 11 but with its outlet closed.
Figure 13:
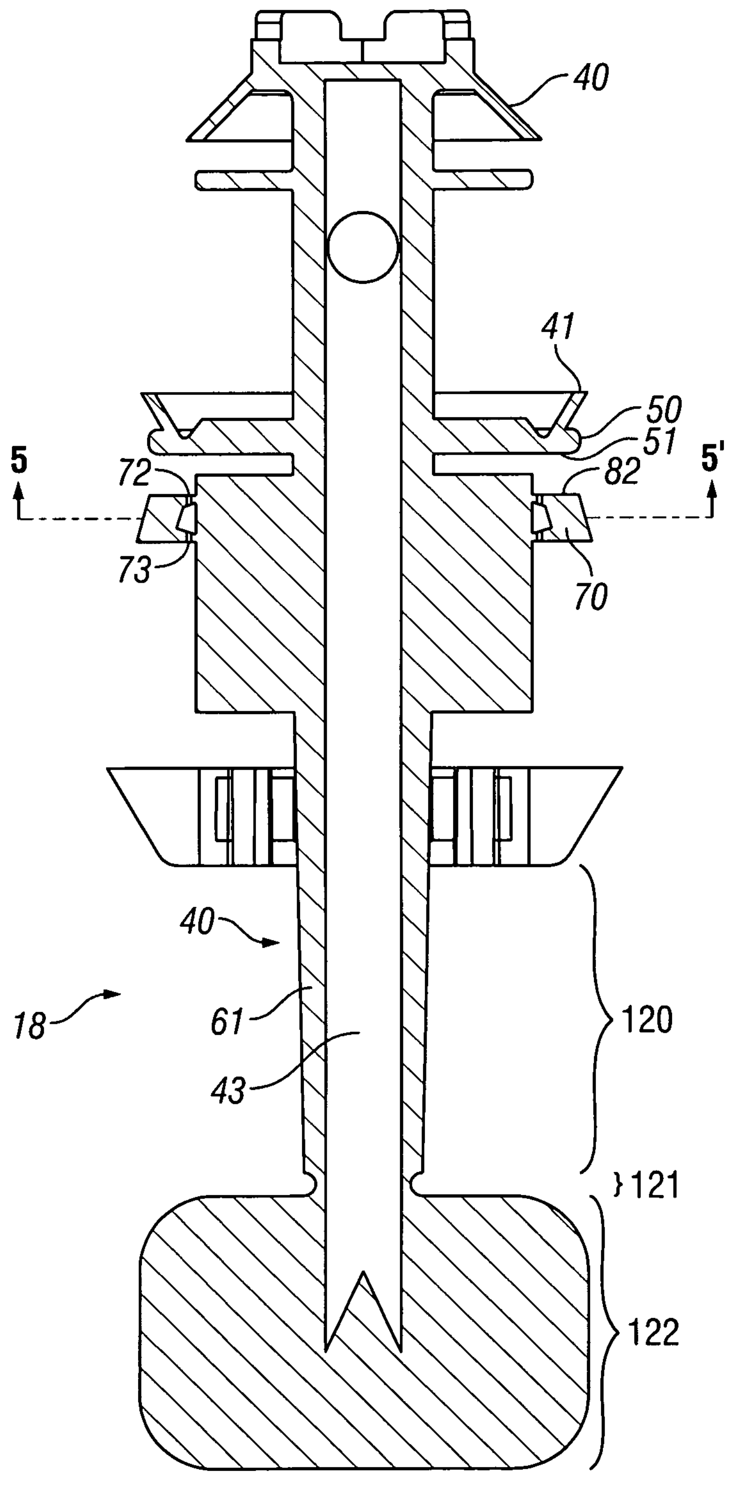
FIG. 13 is an axial cross-section of the piston-forming element shown in FIG. 12.

Reference is now made to a second embodiment of the invention as illustrated in FIGS. 11, 12 and 13 which show a piston 18 identical to the piston shown in the first embodiment of FIGS. 1 to 12 but for the addition of a removable closure-forming outer portion 122 of the cylindrical tube 61 of the stem 40 of the piston 18. As seen in FIG. 11, the stem 40 outwardly from the engagement flange 52 is shown as the generally cylindrical tube 61. The tube 61 has an inner portion 120, an intermediate frangible portion 121 and a removable closure-forming outer portion 122. The passageway 43 through the cylindrical tube 61 effectively extends continuously through the inner portion 120, the intermediate frangible portion 121 and the outer portion 122 to an outer opening 123. The outer portion 122 carries two tabs 124 which extend radially and axially from the tube 61 diametrically from each other. These tabs 124 are adapted for manual engagement to apply forces to the outer portion 122 so as to break the intermediate frangible portion 121 and thereby sever the outer portion 122 from the inner portion 120 exposing the outlet 48 at the broken frangible intermediate portion 122. As can be seen in the drawings and particularly in FIG. 13, the intermediate frangible portion 121 is an annular area about the tube 61 of reduced radial extent as formed by having an annular groove cut into the outer surface of the tube 61. Having regard to the nature of the plastic material from which the tube 61 is formed, the intermediate frangible portion 121 is selected such that manually applied forces to the tabs 123 may break the frangible portion 121.

FIG. 11 illustrates the piston 18 after it has been formed as by injection moulding and with the passageway 43 to extend continuously through the tube 61, that is, continuously through the inner portion 120 through the intermediate frangible portion 121 and through the other portion to be open at the outlet 123. FIGS. 12 and 13 show the piston 18 of FIG. 11 after the piston 18 has been modified to adopt an altered configuration in which the passageway 43 is sealably closed in the outer portion 122 so as to prevent passage through the tube 61 in the outer portion 122. The tube 61 over the outer portion 122 is collapsed on itself preferably by compressing the cylindrical tube 61 proximate the outer end 123 between two heated press plates so as to collapse the tube 61 upon itself and fuse the upper and lower segments of the tube 61 closing the tube and the passageway 43 therethrough in the outer portion 122 as best seen in cross-section in FIG. 13. The piston 18 may preferably have its outer portion 122 sealed into the manner of FIGS. 12 and 13 either before or after the piston 18 may be inserted into the piston chamber-forming body 16 and before or and after the outer stop members 70 have been fixedly secured to the piston chamber-forming body 16. As well, the piston 18 may have its outer portion 122 sealed after the outer stop members 70 have been fixedly secured to the piston chamber-forming body 16 and after the reservoir has been filled with fluid.

The closed outer portion 122 of the piston 18 as seen in FIGS. 12 and 13 closes the pump assembly to fluid flow inwardly or outwardly through the tube 61. In use with the outer stop members 70 secured to the piston chamber-forming body 16 in the transfer position or any position between the fully retracted position and the fully extended position, the outer portion 122 may be broken off by a user manually engaging the tabs 124 and rotating the tabs 124 relative to the piston chamber-forming body 16. The key guide member 54 is held between the outer stop members 70 and 71 substantially against rotation and, hence, manual forces may be applied to the tabs 124 of the outer portion 122 which will result in rotational forces being applied across the intermediate frangible portion 121 which break the frangible portion 121. In the second embodiment of FIGS. 12 and 13, the combination of the outer stop member 170 and the twist off closed outer portion 122 eliminates the need for a separate cover or dust cap. The stop members 70 prevent the piston from being pulled out of the piston chamber-forming body and the closed twist off outer portion 122 keeps the pump sealed before use.

In the preferred embodiment of the invention, the interaction between the key guide member 54 and the outer stop members 70 prevent rotation of the inner portion 120 of the piston 18. Other mechanisms may be provided to prevent relative rotation of the inner portion 120 of the piston 18 relative the outer portion 122.

The preferred embodiment of FIG. 7 shows a pressure relief device 13 inward of the pump assembly. The pressure relief device is not necessary as, for example, when the reservoir is vented or collapsible.

The preferred pump assembly 11 is shown as including the one-way valve 22 and the piston 18 with two discs 41 and 42 in stepped chamber portions. A piston pump or assembly with two discs in a chamber of constant diameter could be used instead as, for example, disclosed in FIG. 9 of U.S. Pat. No. 5,975,360 to Ophardt issued Nov. 2, 1999. The pump assembly of the preferred embodiment could be substituted with other piston pump assemblies. For example, a pump assembly could be used which avoids a separate one-way valve and has three discs such as disclosed, for example, in FIG. 11 of U.S. Pat. No. 5,975,360 which is incorporated herein by reference. Many other piston pump assemblies may be used in substitution of the piston pump assembly shown.

The specific manner of fixedly securing the outer stop members 70 to the fixation portion 75 is not limited to welding. Other methods for securing include the use of adhesives, heat staking, ultrasonic welding, spin welding and mechanical connection including threaded engagement, frictional interaction, snap engagement and the use of opposed catch and latch members.

While the invention has been described with reference to preferred embodiments, it is not so limited. Many variations and modifications will now occur to persons skilled in the art. For a definition of the invention, reference may be made to the appended claims.

We claim:

1. A pump for dispensing fluids comprising:

a piston chamber-forming member having a chamber about a chamber axis, the chamber having a chamber wall, an inner end, an open outer end, an outlet and an inlet, a piston-forming element during operation to pump fluid being received in the piston chamber-forming member axially slidable inwardly and outwardly therein between an extended position and a retracted position in cyclical operation of the pump to draw fluid into the chamber via the inlet and dispense fluid via the outlet, the piston-forming element having an inner end and an outer end, the inner end of the piston-forming element located in the chamber with the piston-forming element extending axially in the chamber from the inner end outwardly from the chamber through the open outer end outwardly to the outer end, the piston-forming element having an inner stop flange member on the piston-forming element, the inner stop flange member having an axially outwardly directed stop surface, the piston-forming element having an outer stop flange member on the piston-forming element outwardly from the inner stop flange member, the outer stop flange member having an axially inwardly directed stop surface, the outer stop flange member removably coupled to the piston-forming element by a frangible bridge member, the frangible bridge member being severable to separate the outer stop flange member from the piston-forming element, the chamber having a fixation portion to engage with the outer stop flange member for facilitating fixedly securing of the outer stop flange member to the piston chamber-forming member, wherein with the outer stop flange member coupled to the piston-forming element, in a transfer position the piston forming element is located in the chamber with the fixation portion engaging the outer stop flange member, wherein in the transfer position the fixation portion and the outer stop flange member are adapted to be fixedly secured together against relative axial movement, wherein in the transfer position after the fixation portion and the outer stop flange member have been fixedly secured together against relative axial movement, the outer end of the piston-forming element is movable relative the piston chamber-forming member to sever the frangible bridge member thereby separating the outer stop flange member from the piston forming element, wherein after the fixation portion and the outer stop flange member have been fixedly secured together against relative axial movement and the outer stop flange member has been severed from the piston-forming element, the outer stop flange member extending radially inwardly from the chamber wall presenting the axially inwardly directed stop surface axially opposed to the axially outwardly directed stop surface on the inner stop flange member and engagement between the axially inwardly directed stop surface and the axially outwardly directed stop surface prevents sliding of the piston-forming element outwardly in the piston chamber-forming member past the outer stop flange member.

2. A pump as claimed in claim 1 wherein the piston-forming element including the outer stop flange member and the frangible bridge member consists of a unitary element formed entirely of plastic by injection moulding.

3. A pump as claimed in claim 2 wherein in the transfer position after the fixation portion and the outer stop flange member have been fixedly secured together against relative axial movement, the movement of the piston-forming element to sever the frangible bridge member is selected from the group consisting of axial movement of the piston-forming element relative the piston chamber-forming member and rotation of the piston-forming element about the chamber axis relative the piston chamber-forming member.

4. A pump as claimed in claim 1 wherein in the transfer position the piston-forming element is in the piston chamber-forming member between the extended position and the retracted position.

5. A pump as claimed in claim 4 wherein, while the outer stop flange member is coupled to the piston-forming element, the fixation portion engages the outer stop flange member to prevent relative axial movement of the piston-forming element relative the piston chamber-forming member axially inwardly.

6. A pump as claimed in claim 4 wherein the chamber wall is circular in cross-section normal to the chamber axis and defines a chamber passageway axially therethrough which is circular in cross-section normal to the chamber axis, the outer stop flange member when engaged with the fixation portion in the chamber extending radially inwardly from the chamber wall to radially inwardly directed rotation stop surfaces which reduce the chamber passageway in a radial cross-section through the outer stop flange member to a shape which is not circular about the chamber axis, the piston-forming element having radially outwardly directed rotation stop surfaces which engage the radially inwardly directed rotation stop surfaces to prevent relative rotation of the piston-forming element relative the chamber about the chamber axis when the piston-forming element is received in the piston chamber-forming member between the retracted position and the transfer position.

7. A pump as claimed in claim 1 wherein the fixation portion including an axially outwardly directed engagement surface, the outer stop flange member having an axially inwardly directed engaging surface complementary to the engagement surface for engagement to locate the outer stop flange member axially relative the fixation portion.

8. A pump as claimed in claim 7 wherein the fixation portion including a radially directed engagement surface, the outer stop flange member having radially directed engaging surface complementary to the engagement surface for engagement to locate the outer stop flange member coaxially relative the fixation portion.

9. A pump as claimed in claim 1 wherein the fixation portion having a frustoconical engagement surface coaxial about the chamber axis, the outer stop flange member having a frustoconical engaging surface coaxial about the chamber axis complementary to the engagement surface for engagement to locate the outer stop flange member axially and centered coaxially relative the fixation portion.

10. A pump as claimed in claim 1 wherein in the transfer position the fixation portion and the outer stop flange member are adapted to be fixedly secured together against relative axial movement by welding.

11. A pump as claimed in claim 1 wherein the piston chamber-forming member is formed by injection moulding from plastic material which is opaque to specific laser light, the outer stop flange member is formed by injection moulding from plastic material which absorbs the specific laser light greater then the plastic material of the piston chamber-forming member, wherein in the transfer position laser light directed radially through the fixation portion may pass into and be absorbed by the outer stop flange member to weld the fixation portion and the outer stop flange member together.

12. A pump as claimed in claim 1 wherein a first of the fixation and the outer stop flange member is formed by injection moulding from a first plastic material which is opaque to specific laser light, and a second, other of the fixation and the outer stop flange member is formed by injection moulding from a second plastic material which absorbs the specific laser light to a greater extent than the plastic material of the piston chamber-forming member, wherein in the transfer position laser light directed through the first of the fixation portion and the outer stop flange member passes into and be absorbed by the second, other of the fixation portion and the outer stop flange member to weld the fixation portion and the outer stop flange member together.

13. A pump as claimed in claim 1 wherein the outer end of the piston-forming element comprises a hollow discharge tube member, the discharge tube member including an axially inner portion, an intermediate frangible portion and an axially outer portion, the inner portion joined to the outer portion by the frangible portion, the frangible portion being severable to separate the outer portion from the inner portion to leave an open outer end of the inner portion as a discharge outlet for fluid, the outer portion being engageable manually by a user for movement relative the inner portion to sever the frangible portion thereby separating the outer portion from the inner portion.

14. A pump as claimed in claim 13 wherein the outer portion when joined to the inner portion by the frangible portion preventing fluid flow outwardly through the discharge tube member.

15. A pump as claimed in claim 13 wherein the movement of the outer portion to sever the frangible portion is selected from the group consisting of radial movement of the outer portion relative the inner portion and rotation of the about the outer portion about chamber axis relative the inner portion.

16. A pump as claimed in claim 13 wherein the outer portion having an engagement member for manual engagement by a user.

17. A pump as claimed in claim 13 wherein the frangible portion comprises a frangible tubular sleeve, when the outer portion is joined to the inner portion by the frangible portion the discharge tube member provides a passageway providing communication through the inner portion, through the frangible portion and through the outer portion to an open outer end of the outer portion, the open outer end of the outer portion adapted to be permanently closed against fluid flow therethrough, wherein the outer portion when joined to the inner portion by the frangible portion and having the outer end of the outer portion closed preventing fluid flow outwardly through the discharge tube member.

18. A pump as claimed in claim 13 wherein the inner stop flange and the outer stop flange are carried on the piston-forming element inwardly of the inner portion.

19. A pump for dispensing fluids comprising:

a piston chamber-forming member having a chamber about a chamber axis, the chamber having a chamber wall, an inner end, an open outer end, an outlet and an inlet, a piston-forming element during operation to pump fluid being received in the piston chamber-forming member axially slidable inwardly and outwardly therein between an extended position and a retracted position in cyclical operation of the pump to draw fluid into the chamber via the inlet and dispense fluid via the outlet, the piston-forming element having an inner end and an outer end, the inner end of the piston-forming element located in the chamber with the piston-forming element extending axially in the chamber from the inner end outwardly from the chamber through the open outer end outwardly to the outer end, the outer end of the piston-forming element comprises a hollow discharge tube member, the discharge tube member including an axially inner portion, an intermediate frangible portion and an axially outer portion, the inner portion joined to the outer portion by the frangible portion, the frangible portion being severable to separate the outer portion from the inner portion to leave an open outer end of the inner portion as a discharge outlet for fluid, the outer portion being engageable manually by a user for movement relative the inner portion to sever the frangible portion thereby separating the outer portion from the inner portion.

20. A method of making a pump for dispensing fluids comprising:

(a) providing a piston chamber-forming member having a chamber about a chamber axis, the chamber having a chamber wall, an inner end, an open outer end, an outlet and an inlet, (b) providing a piston-forming element adapted to be received in the piston chamber-forming member axially slidable inwardly and outwardly therein between an extended position and a retracted position in cyclical operation of the pump to draw fluid into the chamber via the inlet and dispense fluid via the outlet, the piston-forming element having an inner end and an outer end, the inner end of the piston-forming element located in the chamber with the piston forming element extending axially in the chamber from the inner end outwardly from the chamber through the open outer end outwardly to the outer end, the piston-forming element having an inner stop flange member on the piston-forming element, the inner stop flange member having an axially outwardly directed stop surface, the piston-forming element having an outer stop flange member on the piston forming element outwardly from the inner stop flange member, the outer stop flange member having an axially inwardly directed stop surface, the outer stop flange member removably coupled to the piston-forming element by a frangible bridge member, the frangible bridge member being severable to separate the outer stop flange member from the piston forming element, the chamber having a fixation portion to engage with the outer stop flange member for facilitating fixedly securing of the outer stop flange member to the piston chamber-forming member, (c) sliding the piston-forming element axially into the piston chamber-forming member to a transfer position in which the piston-forming element is located in the chamber with the fixation portion engaging the outer stop flange member, (d) coupling the outer stop flange member to the piston-forming element, in the transfer position to fixedly secure the fixation portion and the outer stop flange member together against relative axial movement, (e) after the fixation portion and the outer stop flange member have been fixedly secured together against relative axial movement, moving the outer end of the piston-forming element relative the piston chamber-forming member to sever the frangible bridge member thereby separating the outer stop flange member from the piston-forming element, and wherein after the fixation portion and the outer stop flange member have been fixedly secured together against relative axial movement and the outer stop flange member has been severed from the piston-forming element, the outer stop flange member extending radially inwardly from the chamber wall presenting the axially inwardly directed stop surface axially opposed to the axially outwardly directed stop surface on the inner stop flange member and engagement between the axially inwardly directed stop surface and the axially outwardly directed stop surface prevents sliding of the piston-forming element outwardly in the piston chamber-forming member past the outer stop flange member.

* * * * *